United States Patent [19]

Mick, Jr. et al.

[11] Patent Number: 4,902,372
[45] Date of Patent: Feb. 20, 1990

[54] INNERLINER APPLICATOR

[75] Inventors: Ronald L. Mick, Jr., Clinton; Kent K. Kipling, Solon, both of Ohio

[73] Assignee: Bridgestone/Firestone, Inc., Akron, Ohio

[21] Appl. No.: 226,944

[22] Filed: Aug. 1, 1988

Related U.S. Application Data

[63] Continuation of Ser. No. 96,774, Sep. 14, 1987, abandoned, which is a continuation of Ser. No. 424,740, Sep. 27, 1982, abandoned.

[51] Int. Cl.⁴ .................................... B32B 31/18
[52] U.S. Cl. ............................ 156/361; 156/406.4; 156/446; 156/522
[58] Field of Search ............ 156/350, 351, 352, 361, 156/368, 378, 406.6, 406.4, 405.1, 229, 304.1, 406, 256, 522, 446, 457, 458, 468, 497; 428/150, 305.1, 383

[56] References Cited

U.S. PATENT DOCUMENTS

| | | |
|---|---|---|
| 3,481,520 | 12/1969 | Pickering . |
| 3,972,214 | 8/1976 | Jagersberger . |
| 4,025,384 | 5/1977 | Shiozaki ........................ 156/502 |
| 4,222,811 | 9/1980 | Enders ........................... 156/406 |
| 4,359,675 | 11/1982 | Miller ............................. 425/29 |
| 4,426,901 | 1/1984 | Hogan ............................ 83/861 |
| 4,465,536 | 8/1984 | Makino .......................... 156/133 |

Primary Examiner—Merrell C. Cashion, Jr.
Attorney, Agent, or Firm—Ronald Brietkrenz

[57] ABSTRACT

A device for guiding and applying innerliner material to a tire building drum and more particularly a device for cutting and applying the innerliner material is disclosed. The device further allows for measurement of the stock width and for precise centering of said stock without the possible edge distortion of known guiding systems.

1 Claim, 9 Drawing Sheets

INNERLINER APPLICATOR

This application is a continuation application of our copending application bearing Ser. No. 07/096,774, filed Sept. 14, 1987 which is a continuation application of Ser. No. 06/424,740 filed Sept. 27, 1982, both now abandoned.

BACKGROUND OF THE INVENTION

1. Field of the Invention

This invention relates to a material application means and more particularly to a material application means adapted to apply innerliner material to a tire building drum. Specifically, the instant invention relates to a transfer and application means used in conjunction with a cutter means to cut a predetermined length of innerliner material from a continuous roll of innerliner material and apply said length to a tire building drum. The instant invention employs means for accurately centering the innerliner material within the transfer and application means and means for accurately controlling the amount of overlap of the ends of the innerliner material applied to the tire building drum.

2. Description of the Prior Art

Means for material application are old in the art as evidenced by U.S. Pat. No. 3,157,542 to Trevaskis which relates to the feeding of sheets of rubber to a former, U.S. Pat. No. 3,728,181 to Simmons which discloses a rubber material fed from a roll past a cutter onto a drum, U.S. Pat. No. 3,909,338 to La Blonde et al which discloses supplying an elastomeric strip to a bead ring past a cutting unit, U.S. Pat. No. 4,222,811 to Enders which discloses a tail retractor and tray feeder in the form of flotation trays including automatic mechanical systems for feeding the tacky rubber material to a drum, and U.S. Pat. No. 3,898,116 to Katagiri et al which discloses a support having vacuum in the central portion to hold a carcass sheet onto a conveyor and air pressure on the side to float the side. U.S. patent application Ser. No. 147,644 to Miller filed May 17, 1980 discloses a means for automatically applying a tire component to a tire building drum including means for centering and stretching the component. This application is hereby incorporated herein by reference.

Although some of the art discussed above does disclose means for applying a rubber material to a tire building drum, none of the above noted art discloses a means for applying an innerliner to a tire building drum wherein the need for a splice gumstrip is eliminated. Further, the final guide system employed by the instant invention to move the stock to the center of the applicator allows for stock width measurement and precise centering without the edge distortion caused by the guiding systems of the prior art.

There is, therefore, a need for an apparatus which is readily adapted to be used in conjunction with an automated tire assembly system wherein a portion of innerliner material may be cut from a continuous roll of such innerliner material and applied to a tire building drum in such a fashion as to eliminate the need for a splice gumstrip and further be applied in such a manner that allows for stock width measurement and precise centering without the possible edge distortion of known guiding systems. The instant invention provides such a means allowing for the precise application of innerliner material to a tire building drum.

SUMMARY OF THE INVENTION

The present invention relates to a means and method for applying innerliner material to a tire building drum and more particularly to a means and method for cutting and applying the innerliner material in order to eliminate the need for a splice gumstrip and further providing a means for allowing for stock width measurement and precise centering without the possible edge distortion of known guiding systems.

DESCRIPTION OF AN EXEMPLARY EMBODIMENT

Figure 1:
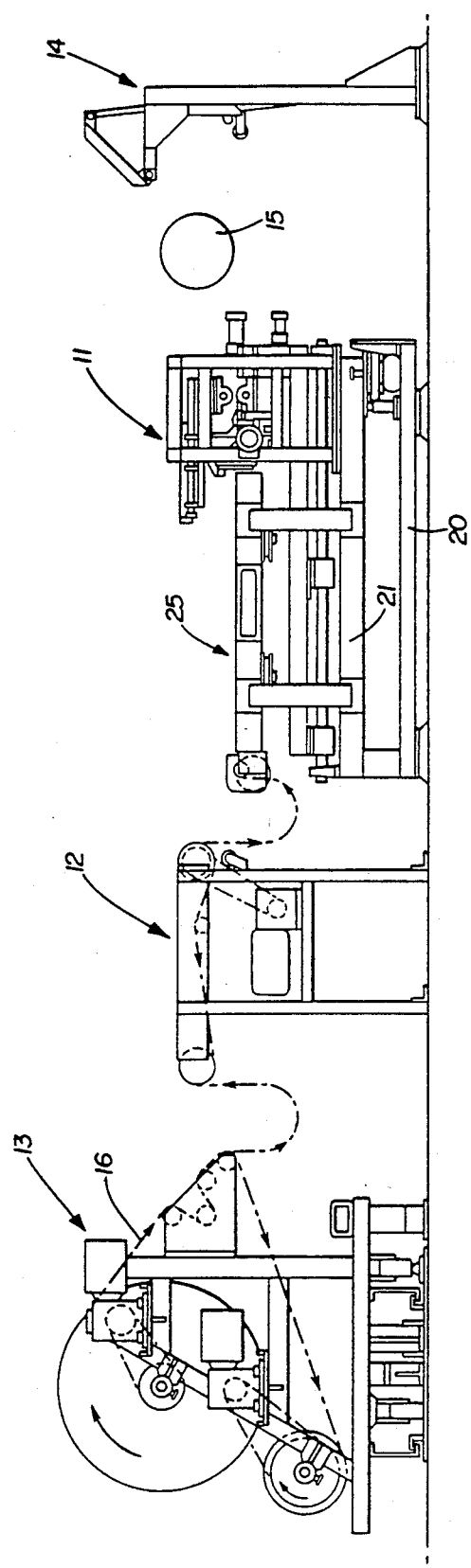
FIG. 1 is a side elevation of the innerliner applicator system embodying the instant invention.

Referring now to FIG. 1 of the drawings, there is disclosed the instant invention comprising an applicator 11, a splice conveyor 12, a feed mechanism 13 and a holding roll 14. In the exemplary embodiment, the applicator 11 is adapted to apply innerliner material 16 to the tire building drum 15. A large roll of a continuous length of innerliner material 16 is fed from the feed mechanism 13 to the splice conveyor 12. The splice conveyor 12 is adapted to allow lengths of innerliner material from different rolls to be joined in order to form a continuous length thereof. From the splice conveyor 12, the innerliner material travels to the applicator 11.

The applicator 11 grasps the end of the innerliner material 16 and moves the end to the bottom of the tire building drum 15 and presses the innerliner material 16 to the bottom of the drum 15 causing the innerliner material 16 to adhere to the bottom of the tire building drum 15 due to the tackiness of the innerliner material 16. The tire building drum 15 is then rotated in order to cause the innerliner material 16 to partially wrap around the tire building drum 15. After a sufficient portion of innerliner material 16 has been wrapped on the tire building drum 15, the innerliner material 16 is severed by a cutting mechanism contained within the applicator 11. The applicator 11, in conjunction with rotation of the tire building drum 15, then causes the remainder of the cut piece of innerliner material 16 to be applied to the tire building drum 15. The holding roll 14 is utilized to assist in holding the innerliner material 16 on the tire building drum 15 for reasons which will be discussed more fully below.

It can thus be seen that there are provided means for automatically dispensing from a continuous roll of innerliner material a length of said innerliner material suitable for applying to a tire building drum and the means for applying said innerliner material to said tire building drum. The instant invention may be used in conjunction with an automated tire assembly system disclosed in patent application Ser. No. 386,373 entitled Work Station and filed in the name of Loeffler et al, which application is specifically incorporated by reference herein.

Figure 2:
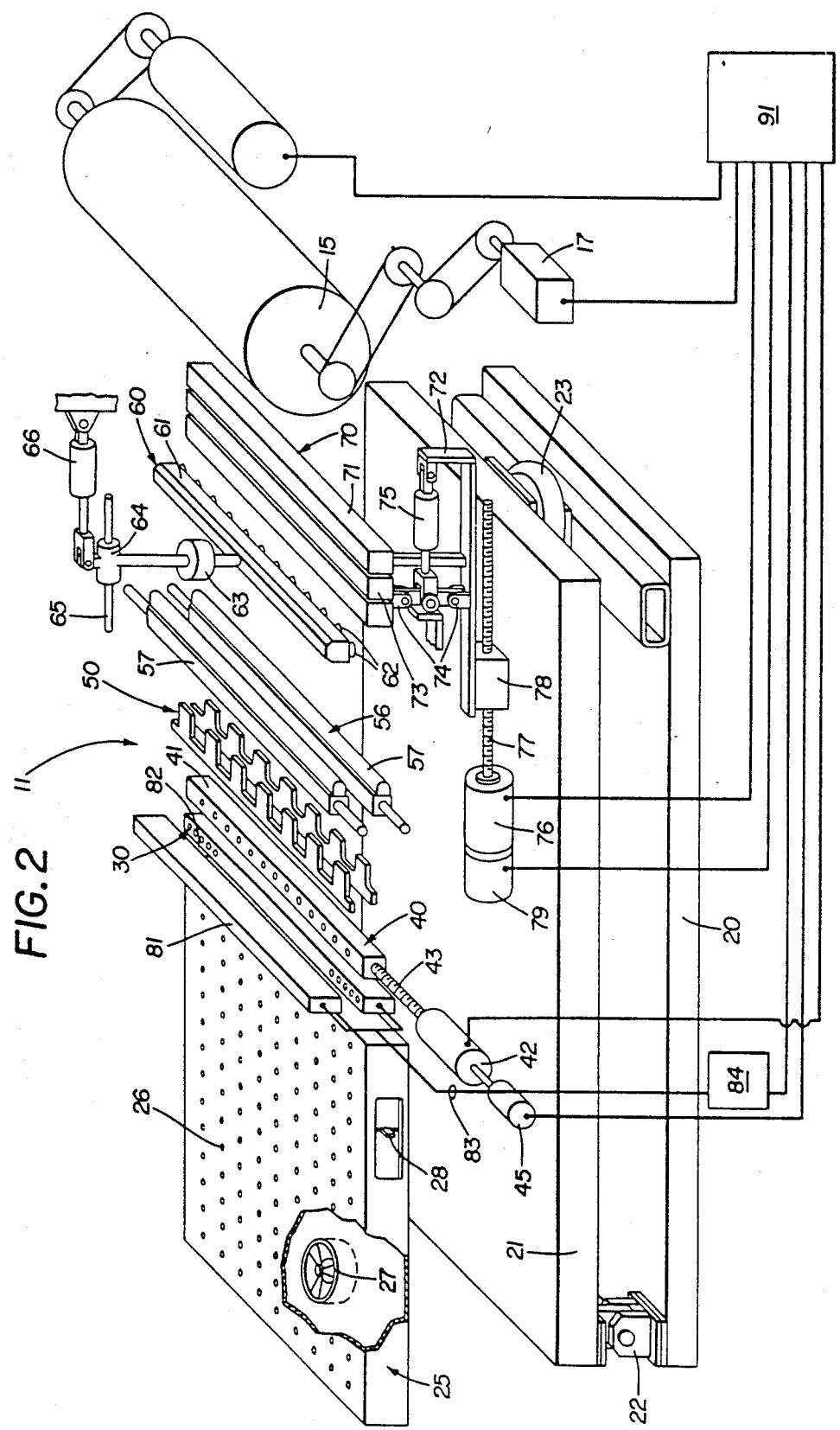
FIG. 2 is a simplified perspective drawing showing the main operative elements of the innerliner applicator shown in FIG. 1.
Figure 3:
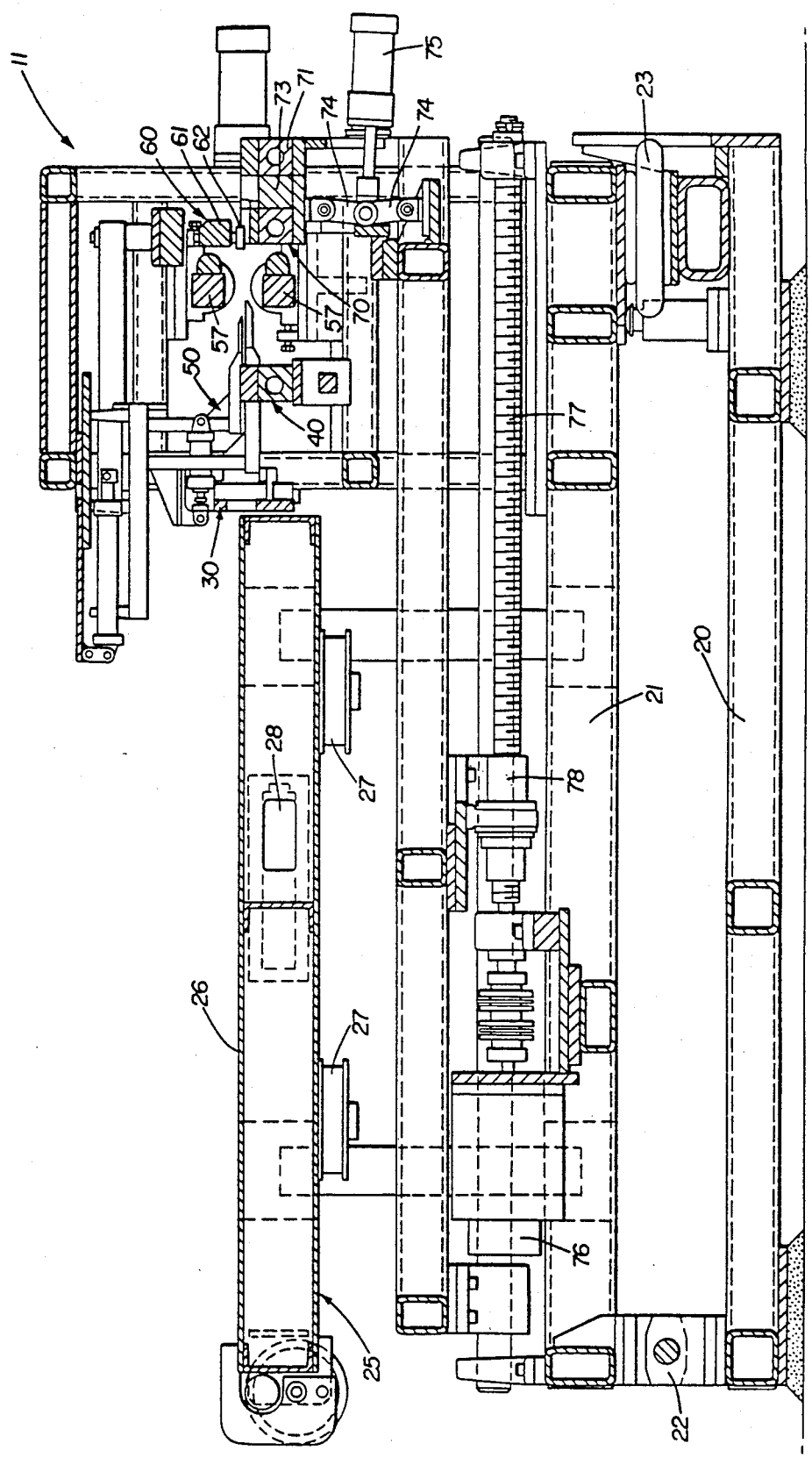
FIG. 3 is a side view of the innerliner applicator showing the details of construction thereof.
Figure 4:
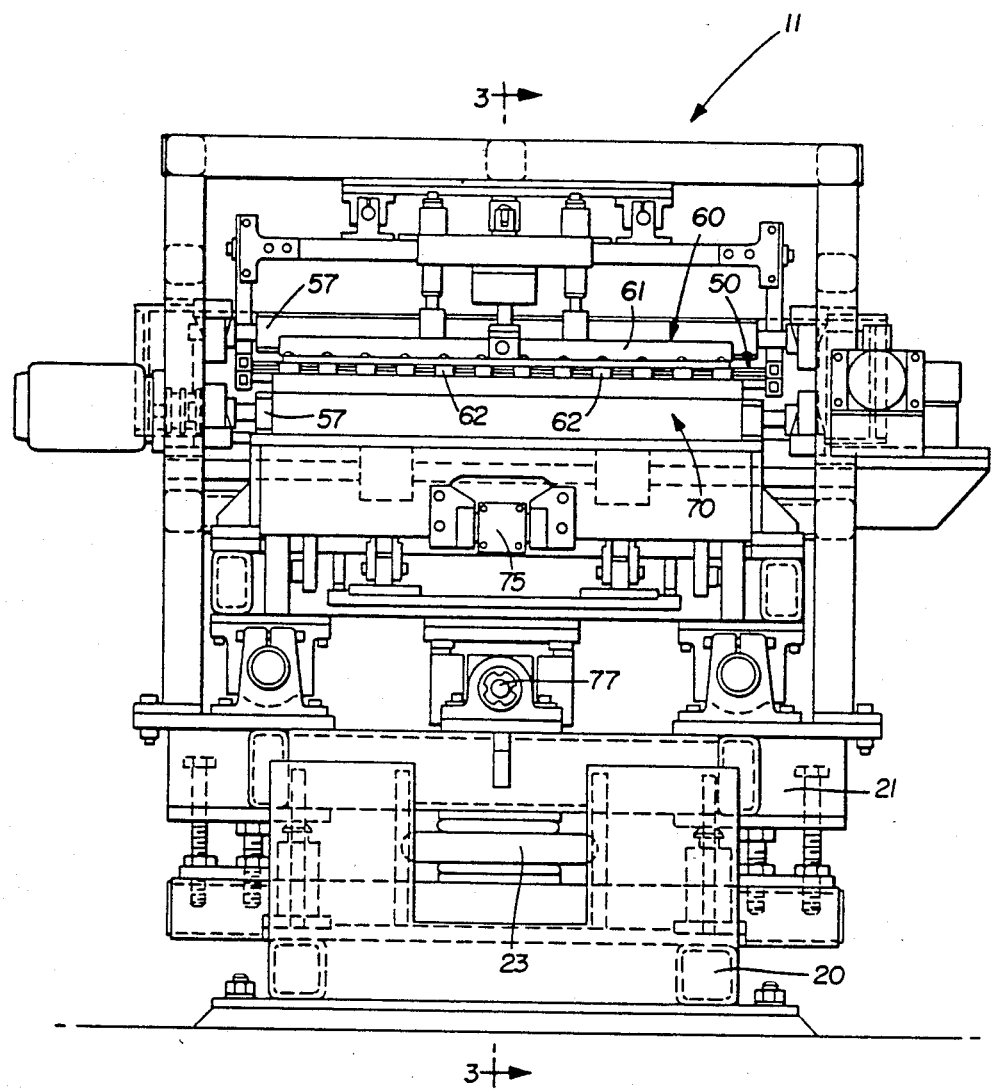
FIG. 4 is a front view of the apparatus shown in FIG. 3.

Referring now to FIG. 2 of the drawings, there is shown a simplified schematic diagram showing the major operative elements of the applicator 11. The applicator 11 rests on base 20. Sub-frame 21 is supported upon the base 20 by means of pivot connections 22 and air spring 23. For reasons which will become more apparent below, the sub-frame 21 may be pivoted about the pivot connections 22 relative to the fixed base 20 by causing the air spring 23 to either inflate or deflate by means of pneumatic circuitry well known to one skilled in the art.

Supported upon the sub-frame 21 is air table 25. Air table 25 is comprised of a flattened rectangular box-like structure having a perforated upper surface 26 and a plurality of fans 27 mounted on the bottom of the air table 25 in order to introduce air into the generally rectangular box-like structure. The air introduced into the generally box-like structure by the fans 27 is exhausted through the top of the box-like structure through the perforated upper surface 26 thus providing an air-bearing type surface over which innerliner material 16 may be transported. As will be appreciated later, the air-bearing provided by the air table 25 facilitates both longitudinal and latitudinal movement of the innerliner material upon the air table 25 to allow positioning thereof. Located on the side of the air table 25 is baffle 28 which may be adjusted to either increase or decrease the opening of the baffle 28 in order to adjust the amount of air exhausted through the perforated upper surface 26.

Disposed proximate to the air table 25 is fiber optic guidance unit 30 which is comprised of two linear arrays of fiber optic cables in optic communication with a series of photo electric source/detectors which are utilized to determine the position of the innerliner material 16 with respect to the fiber optic guidance unit 30 in order to facilitate positioning of the innerliner material as more fully described below.

Lateral adjustment unit 40 is comprised of a manifold 41 having a series of orifices in the upper surface thereof to which a vacuum may be selectively applied. The manifold 41 may be laterally displaced by means of drive motor 42, rotating lead screw 43, acting in conjunction with an engagement nut on manifold 41 in order to allow the manifold 41 to be laterally displaced. The position of the lateral adjustment unit 40 can be determined with rotary encoder 45.

Disposed above the lateral adjustment unit 40 is gripper unit 50 which is adapted to grasp the innerliner material upon actuation of a cylinder (not shown) by means of a pair of interlocking fingers which may be moved relative to one another by means of the cylinder.

Mounted adjacent to the gripper unit 50 is crush cutter 56 which is comprised of two eccentrically mounted cutting elements 57 adapted to be rotated into an engaging position by a cylinder (not shown) in order to sever the innerliner material 16 disposed between the cutting elements 57. The details of construction of the crush cutter are more fully illustrated in U.S. patent application Ser. No. 321,983 filed in the name of James E. Hogan et al, which patent application is hereby incorporated by reference.

Disposed forward and above the crush cutter 56 is upper guide member 60. The upper guide member 60 is comprised of a manifold 61 having on the bottom thereof a plurality of cups 62 to which either a vacuum or air pressure may be applied. The manifold is mounted via cylinder 63 to slide member 64 which is adapted to slide along the track 65 by means of actuation of cylinder 66. The upper guide member 60 is utilized to transport the end of the innerliner material 16. It should be appreciated that the manifold 61 may be moved up and down by means of cylinder 63 and longitudinally by means of cylinder 66.

The transfer unit 70 is comprised of a front manifold 71 which is fixedly attached to transfer frame 72 and rear manifold 73 which is linked to transfer frame 72 by links 74. Pivotly attached to the links 74 is cylinder 75 having its barrel end pivotly attached to the transfer frame 72. The actuation of the cylinder 75 causes the links 74 to be pivoted about their common connection thereby causing the rear manifold 73 to be raised or lowered.

The transfer frame 72 is longitudinally movable by means of drive motor 76 driving lead screw 77 which is engaged with lead screw nut 78 which is fixedly attached to the transfer frame 72. There is thus provided a means for longitudinally moving the transfer unit 70 from a position proximate to the manifold 61 to a position proximate to the bottom of tire building drum 15. The position of the transfer unit 70 can be determined from the outputs provided by encoder 79.

It should now be appreciated that there are provided means for transferring innerliner material 16 over the air table 25 past the fiber optic guidance unit 30 which provides control of the lateral adjustment unit 40 in order to centrally position the innerliner material 16 with respect to the centerline of applicator 11 wherein the innerliner material may be severed by the crush cutter 56 and then applied to the tire building drum 15 with the assistance of the transfer unit 70 and the guide member 60, all as more fully described below.

Figure 5:
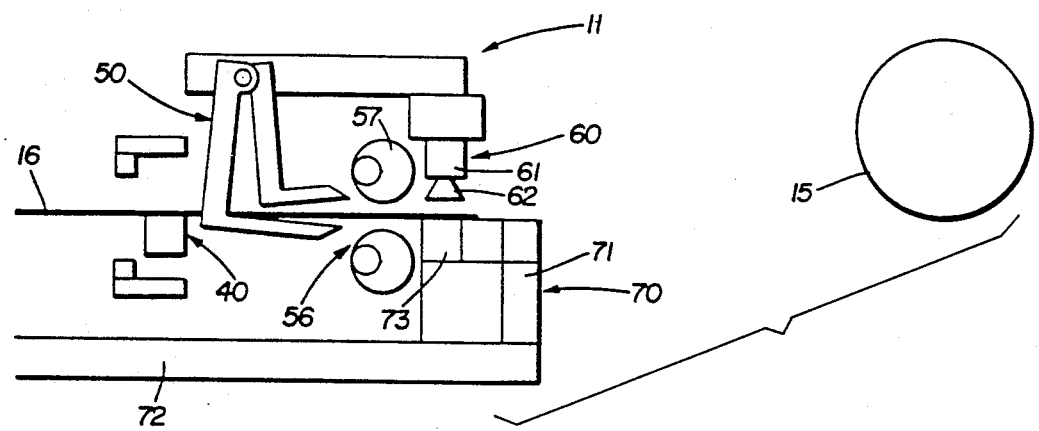

Referring now to FIG. 5 of the drawings there is shown a simplified schematic drawing of the main operative elements of the applicator 11. Specifically, there is shown the innerliner material 16 disposed on the lateral adjustment unit 40 and the transfer unit 70. The gripper unit 50 is open and the crush cutter 56 is also open while the upper guide member 60 is in its raised rearward position. The transfer frame 72 is also in its most rearward position. The leading edge of the innerliner material 16 is held to the rear manifold 73 by a vacuum applied thereto. This configuration represents the starting position of the sequence of operation of the applicator 11.

Figure 6:
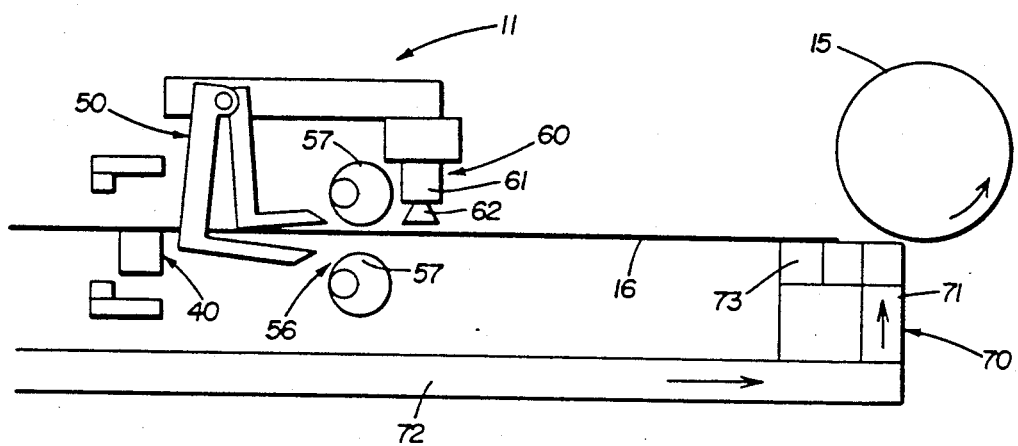

In the second step in the sequence of operation of the applicator 11, as disclosed in FIG. 6 of the drawings, the transfer unit 70 is moved forward toward the tire building drum 15. Simultaneously the drum 15 is rotated to position a tack strip on the drum 15 at its dead center bottom and the air spring 23 is inflated in order to cause the sub-frame 21 to pivot about pivot connections 22 to thereby cause transfer frame 72 and thus transfer unit 70 to move upwardly toward the tire building drum 15.

Figure 7:
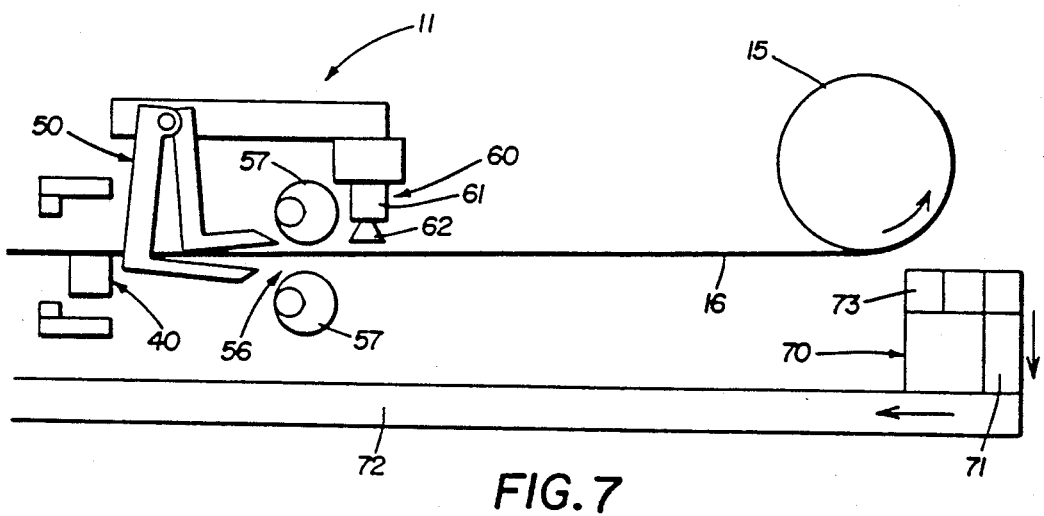

In the third step in the sequence of operation of the applicator 11 as shown in FIG. 7 of the drawings, the transfer unit 70 has been positioned such that the leading edge of the innerliner material 16 has been placed in contact with the tack strip of the tire building drum 15 in order to cause the innerliner material 16 to adhere to the tack strip of the tire building drum 15. After the leading edge of the innerliner material 16 has been transferred to the building drum 15 the transfer unit 70 is moved downwardly and retracted toward the applicator 11. During the transfer of the leading edge of the innerliner material 16 to the tire building drum 15, the drum 15 is rotated and the transfer unit 70 is moved forward synchronously. As the rear manifold 73 passes the drum 15 air pressure is provided to the rear manifold 73 and the sub-frame 21 is simultaneously lowered by air spring 23 in order to effect the transfer of the innerliner material 16 to the tire building drum 15.

Figure 8:
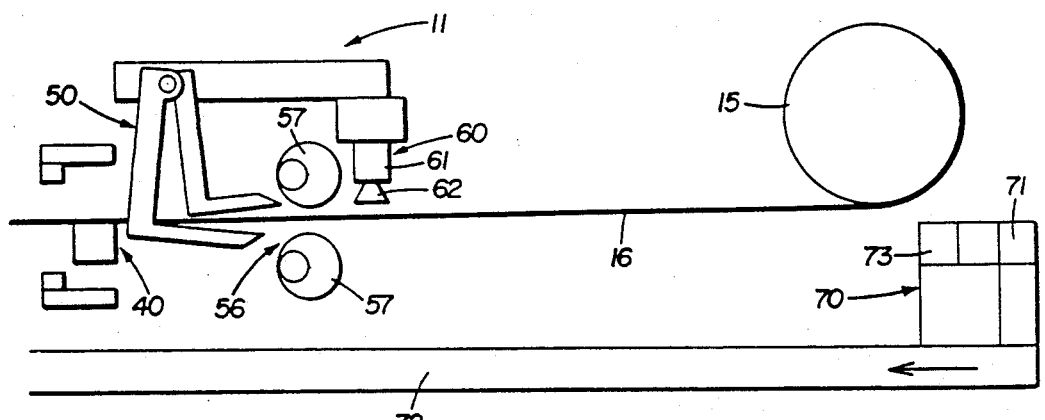

The next step of the applicator sequence of operations is disclosed in FIG. 8 of the drawings. In this step the fiber optic guidance unit 30 in combination with the lateral adjustment unit 40 causes the innerliner material 16 to be centered within the applicator 11.

Figure 18:
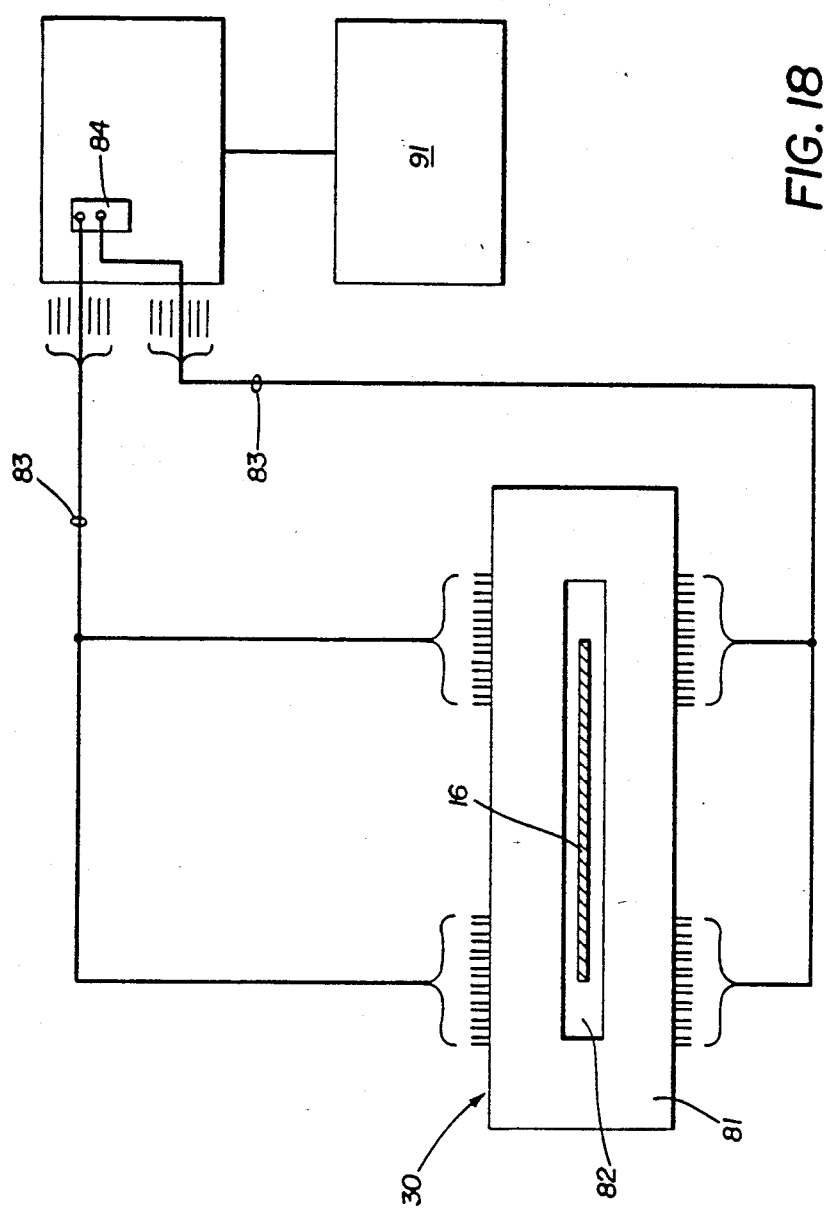
FIG. 18 is a schematic illustration of the fiber optic guidance unit of the instant invention.

Specifically, the fiber optic guidance unit 30 as shown in FIG. 18 of the drawings is comprised of a mounting plate 81 having an opening therein 82 through which the innerliner material 16 may pass. Disposed towards the ends of the opening 82 are a series of paired recepticles for receiving the ends of fiber optic cables. At each end of the mounting plate 81 are located eight pairs of fiber optic cable recepticles located approximately one-half inch apart in which fiber optic cables may be mounted. The fiber optic cables 83 mounted within the mounting plate 81 are in communication with a plurality of conventional photoelectric source/detectors 84 such that oppositely disposed pairs of fiber optic cables are in optical communication with a given photoelectric source/detector such that any interruption of the light passing between the oppositely disposed pairs of fiber optic cables mounted in the mounting plate 81 will thus produce an output signal from the corresponding photoelectric source/detector 84. The output signal is provided to control 91 which ulitizes the output signals to control drive motor 42 and, hence, the latitudinal position of lateral adjustment unit 40. In the exemplary embodiment the control 91 is Struthers-Dunn Director 4001 programable controller manufactured by Struthers-Dunn, Inc. of Bettendorf, Iowa.

It can thus be seen that as the innerliner material is transported through the opening 82 of the mounting plate 81 of the fiber optic guidance unit 30, the innerliner material 16 will cause the light path between various ones of the ends of fiber optic cables to be interrupted thus providing an indication of the position of the innerliner material within the opening 82 of the mounting plate 81.

In order to center the innerliner material 16 within the mounting plate 81 which itself is centrally mounted within the applicator 11, the lateral adjustment unit 40 is caused to transport the innerliner material to one side of the mounting plate 81 in order to cause an equal or symetrical number of fiber optic pairs to have their light paths interrupted. The innerliner material 16 is then moved by the lateral adjustment unit 40 to the opposite side of the mounting plate 81 until an unequal or non-symetrical number of photo detectors have their light paths interrupted. The encoder associated with the lateral adjustment unit then measures the position of the lateral adjustment unit. The lateral adjustment unit then causes the innerliner material 16 to be moved in the opposite direction until another point of nonsymetry is obtained. At this point the pulse count is then measured and divided in order to obtain the excess width of the innerliner material 16. The innerliner material is then moved back half the distance of the excess width to center it within the mounting plate 81.

The above described method of centering the innerliner material within the applicator 11 allows for the accurate centering of innerliner material wherein the width of the innerliner material may vary substantially. The method described above thus essentially determines where the center of the innerliner material is located and then positions the center of the innerliner material coincident with the centerline of the applicator 11. This centering is accomplished without physically touching the edges of the innerliner material 16.

During the time that the innerliner material 16 is being centered within the applicator 11, the transfer unit 70 is being retracted towards the crush cutter 56.

Figure 9:
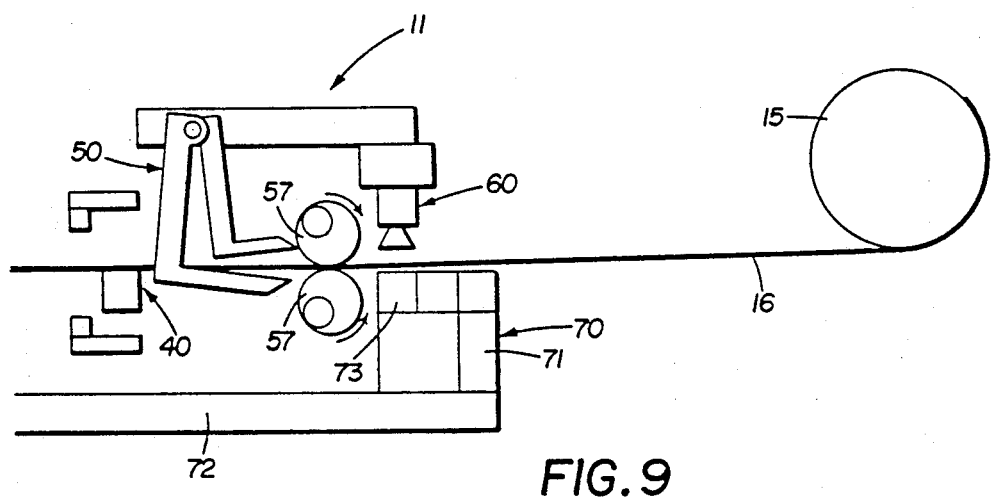

FIG. 9 discloses step 5 of the operating sequence wherein cutting elements 57 of the crush cutter 56 are rotated in order to cut the innerliner material 16.

Figure 10:
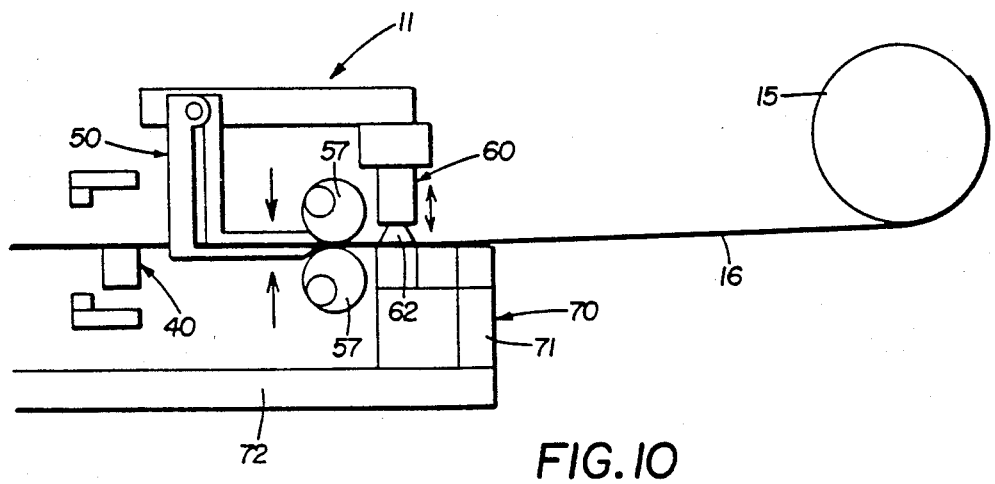

Step 6 shown in FIG. 10 discloses the next step of the operating sequence wherein the gripper unit 50 is caused to grab the innerliner material 16. The manifold 61 with its suction cups 62 is lowered to contact the innerliner material and grip the innerliner material by means of a vacuum applied to the manifold 61. The manifold 61 is then raised slightly.

Figure 11:
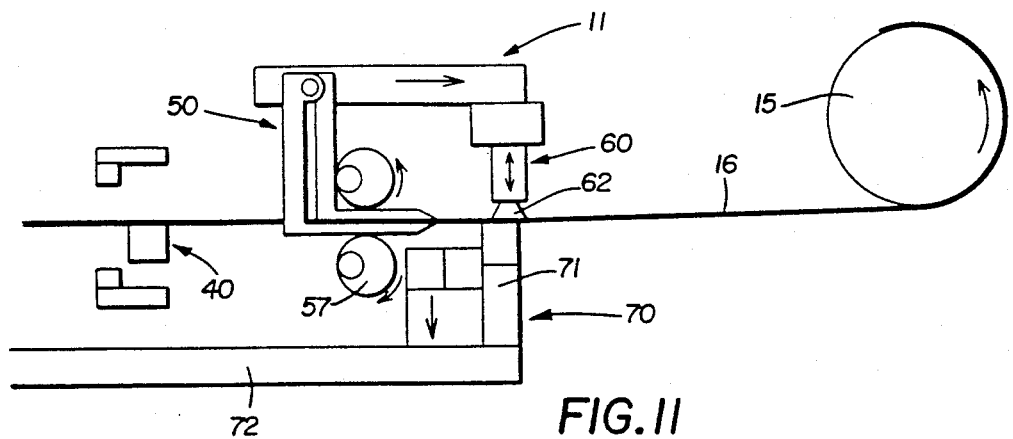

The next step in the operating sequence as shown in FIG. 11 discloses the rotating of the cutting elements 57 in order to allow the opening of the crush cutter 56 thereby allowing the gripper unit 50 and the manifold 61 to simultaneously move forward. As the gripper unit 50 and manifold 61 are moved forward the tire building drum is simultaneously rotated to take up the slack in the innerliner material 16. After the manifold 61 is moved over the front manifold 71, the manifold 61 is lowered and a vacuum is applied to the front manifold 71 while removing the vacuum from the manifold 61 and causing air pressure to be applied to the manifold 61, thus causing a transfer of the innerliner material 16 from the suction cups 62 of manifold 61 to the front manifold 71 of transfer unit 70. The manifold 61 is then raised clear of the innerliner material 16.

Figure 12:
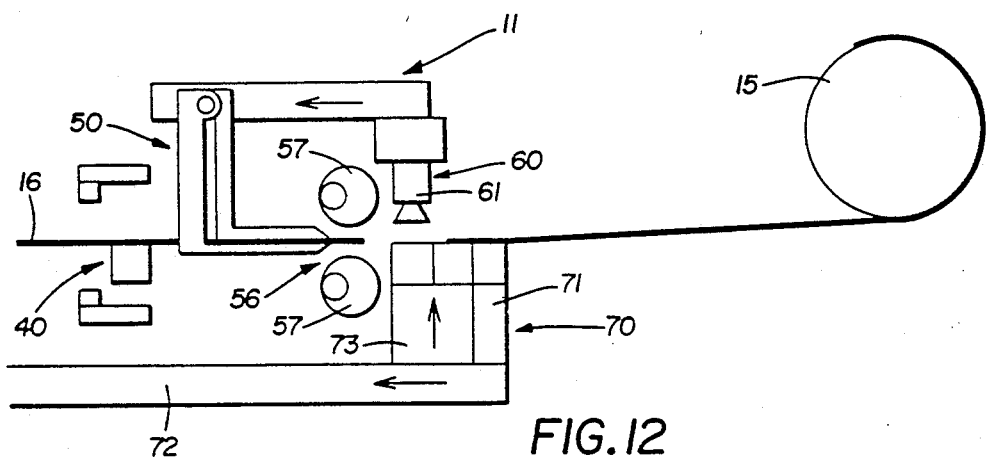

In the next step in the operating sequence as disclosed in FIG. 12, the upper guide member 60 and the gripper unit 50 are retracted back towards the air table 25 causing the innerliner material 16 to separate from where the innerliner material had been crushed by the crush cutter 56. In addition, during this step the transfer frame 72 is moved back in order to correct for the length of innerliner material cut.

In order to produce an acceptable splice of the cut ends of the innerliner material 16, it is important that the overlap of the crushed ends does not exceed the crushed portions of the innerliner material. Accordingly, the length of the innerliner material 16 cut is slightly shorter than the circumference of the tire building drum 15. In order to correct for this slight shortness of length, the cut portion of the innerliner material 16 is stretched by the retraction of the transfer frame 72 as disclosed in FIG. 12 in order to cause the cut length of innerliner material to assume the correct length in order that it may be properly spliced at its ends.

In order that the innerliner 16 may be accurately applied to the tire building drum 15, it is necessary that the tire building drum be controlled with extreme accuracy. Due to the size and moment of inertia of the tire building drum, it is extremely difficult to accurately stop the drum precisely at a specified position. However, it is relatively easy to measure the angular position of the tire building drum by means of a rotary encoder 17 as shown in FIG. 2 of the drawings. As shown in FIG. 2, the rotary encoder 17 is driven via an intermediate jack shaft from the shaft of the tire building drum 15. Since the rotary encoder 17 is driven from the shaft as opposed to the surface of the tire building drum 15, the rotary encoder 17 measures angular displacement and not circumferential displacement of the tire building drum 15.

The rotary encoder 17 thus accurately measures the angular position at which the first end of the innerliner material 16 is applied to the tire building drum as shown in FIG. 7 of the drawings. In the exemplary embodiment the angular position is in the form of a count corresponding to the output of the rotary encoder 17. The tire building drum is then rotated for a predetermined fixed period of time and the angular displacement represented by the count output of the rotary encoder 17 is measured. The first count output representing the angular position of the tire building drum at which the first end of the innerliner material 16 was applied to the tire building drum is subtracted from the count obtained as a result of rotating the building drum for the predetermined fixed period of time. The resulting difference is an accurate value corresponding to the length of innerliner material that has already been applied to the tire building drum. Therefore, it can be readily determined the length of innerliner material needed to apply to the remainder of the tire building drum 15.

The innerliner material 16 is then cut to thereby produce a length of innerliner material 16 having a length shorter than the nominal circumference of the tire building drum 15. It should be appreciated that since the instant invention is intended to be used in conjunction with a system employing a plurality of tire building drums 15, the length of innerliner material 16 must be shorter than the circumference of the smallest tire building drum.

The tire building drum 15 is then rotated simultaneously while the transfer unit 70 is moved toward the tire building drum 15 to cause the cut piece of innerliner material 16 to wrap around the tire building drum 15. The coordination of the rotation of the tire building drum 15 and the transfer unit 70 is such that the end of the innerliner material 16 will precisely overlap the previously applied end of the innerliner material. It should be noted that by measuring the angular displacement of the tire building drum instead of its circumferential distance, variations in the diameter of the tire building drum may be compensated for by the stretching of the innerliner material 16 during its application to the tire building drum 15. During the stretching of the innerliner material 16, the holding roll 14 is biased against the tire building drum 15 in order to cause the innerliner material 16 to be wrapped about the tire building drum 15.

Figure 13:
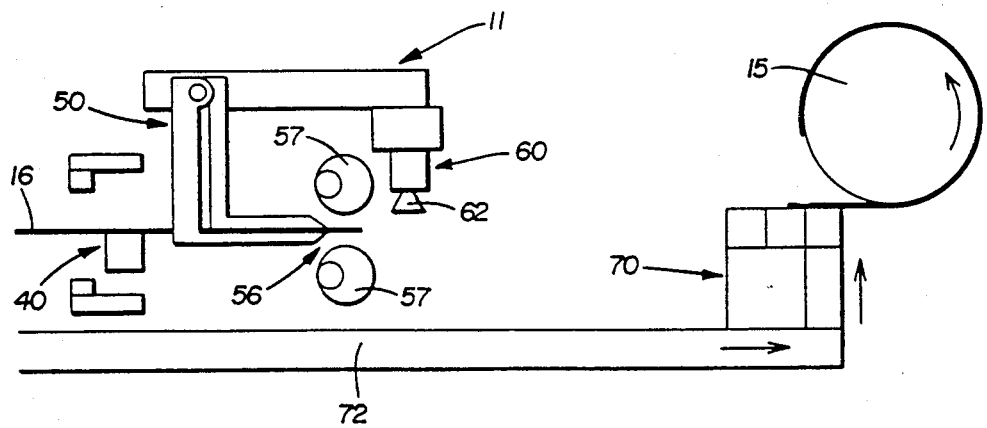

During the next step in the operating sequence shown in FIG. 13 the trailing edge of the innerliner material is held to the front manifold by a vacuum and the tire building drum 15 is rotated simultaneously while the transfer frame 72 is moved forward and the sub-frame 21 is slightly raised in order to allow the innerliner material to be wrapped about the tire building drum 15.

Figure 14:
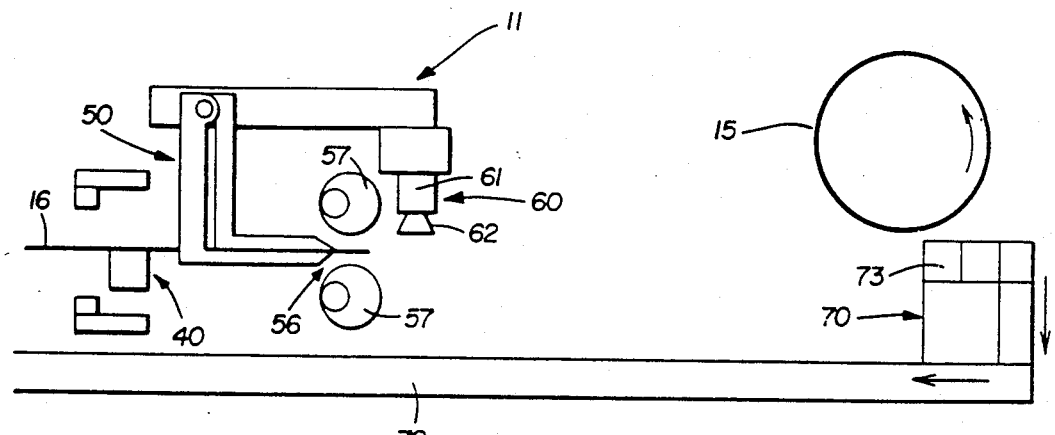

In step number 10 as disclosed by FIG. 14 the transfer unit 70 passes under the tire building drum 15 and the two ends of the innerliner material are spliced together. The transfer unit 70 is then lowered and retracted back to the applicator 11.

Figure 15:
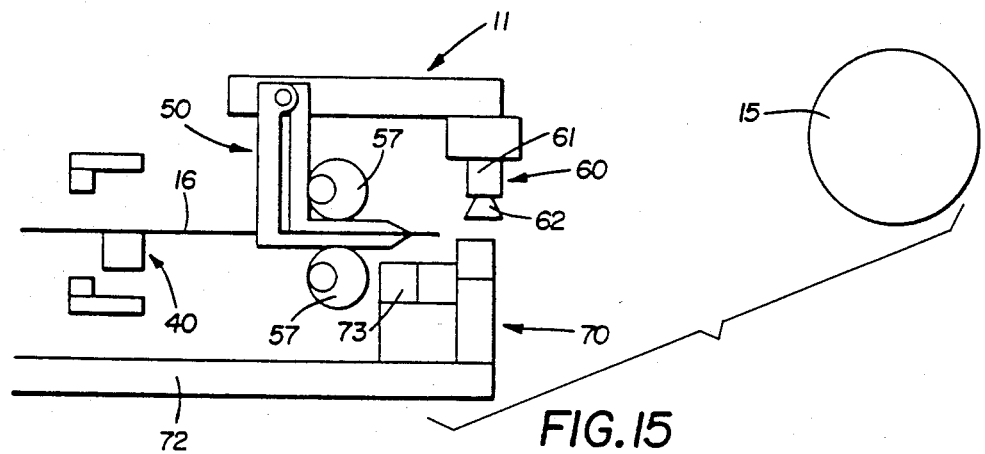

During the next step as shown in FIG. 15 of the drawings the gripper unit 50 is moved forward in order to position the leading edge of the innerliner material over the rear manifold 73 of the transfer unit 70.

Figure 16:
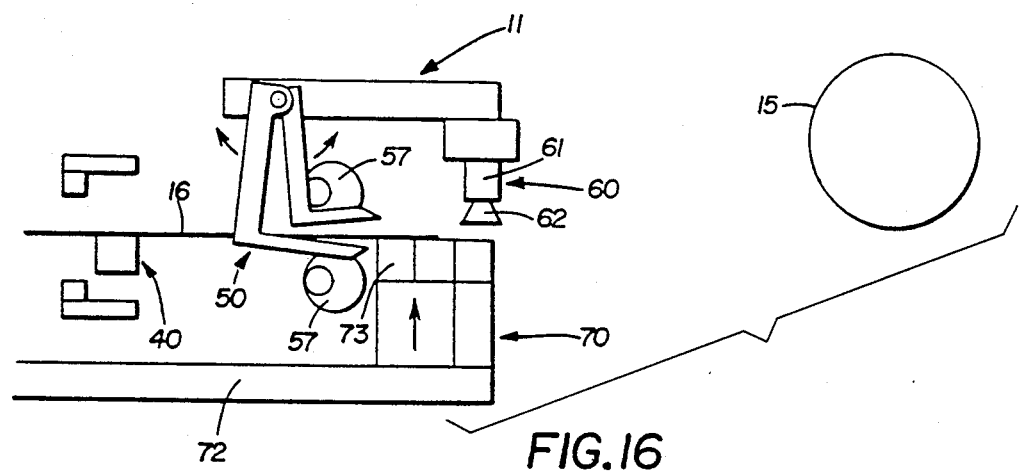

In FIG. 16 step 12 is disclosed wherein gripper unit 50 releases the innerliner material 16 and a vacuum is caused to be placed on rear manifold 73 of transfer unit 70 in order to transfer the innerliner material from gripper unit 50 to transfer unit 70.

Figure 17:
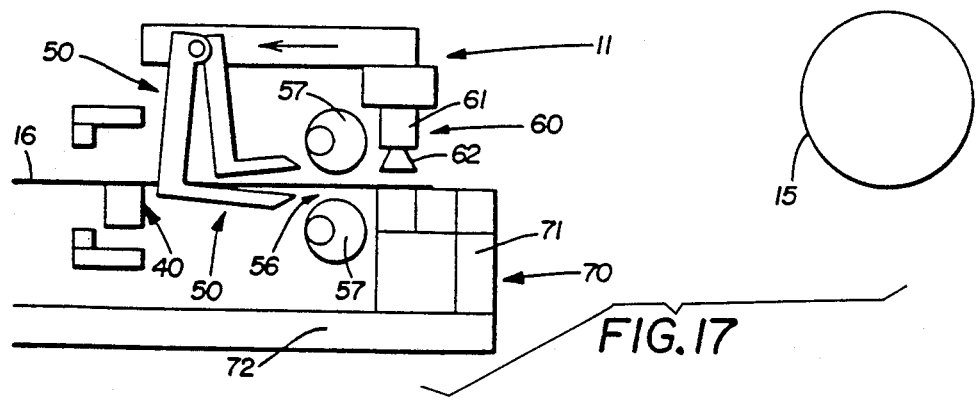
FIGS. 5 through 17 are simplied schematic drawings illustrating the sequence of operation of the innerliner applicator.

As shown in FIG. 17 the gripper unit 50 and the upper guide number 60 are returned to their initial positions. Thus the applicator 11 is ready to begin another operating sequence.

There has thus been disclosed a means for automatically dispensing from a continuous roll of innerliner material, a length of said innerliner material suitable for applying to a tire building drum. And the means for applying said innerliner material to said tire building drum, wherein the innerliner material is centrally positioned within an applicator means by means of a photoelectric array used in conjunction with positioning means. In addition, means are provided in order to accurately apply the innerliner material to the tire building drum with an accurately determined amount of overlap by providing for length correction of the innerliner material applied to the tire building drum.

It will be apparent to those skilled in the art that various modifications and additions may be made in the instant invention without departing from the essential features thereof, which are intended to be defined and secured by the appended claims.

What is claimed is:

1. An apparatus for use in connection with a system employing a plurality of drums having varying circumferences for applying a portion of a continuous length of innerliner material to a selected one of said drums comprising:
   (a) transport means including a suction manifold moveable longitudinally generally horizontally in a forward direction for transporting said innerliner material from said continuous length to said drum and being moveable generally vertically towards and away from said drum for applying one end of said innerliner material to said drum, said suction manifold being moveable in a longitudinal rearward direction for stretching said innerliner material after said one end has been applied to said drum and prior to application of a second end of a remaining portion of said innerliner material to said drum by said suction manifold;
   b) cutting means for severing a portion of said innerliner material from said continuous length;
   c) measuring means for measuring the angular displacement of said drum and providing an output thereof;
   d) calculating means for calculating the length of innerliner material required to completely wrap around the drum based upon the measured angular displacement of said drum;
   e) centering means for centering the innerliner material with respect to said drum after said one end has been applied to the drum by the suction manifold and prior to the suction manifold applying the second end of the remaining portion of said innerliner material to said drum; and
   f) control means in communication with said measuring means and calculating means for causing said cutting means to sever a portion of said innerliner material from said continuous length, said portion being shorter than the circumference of the smallest drum in the system, and for causing said innerliner material to be stretched by the suction manifold before it is applied to said drum and for causing said suction manifold to transport said stretched portion of innerliner material toward said drum and to apply said stretched portion to said drum.

* * * * *